United States Patent
Lim et al.

(10) Patent No.: US 8,363,665 B2
(45) Date of Patent: Jan. 29, 2013

(54) METHOD AND SYSTEM FOR BYPASSING 3GPP PACKET SWITCHED CORE NETWORK WHEN ACCESSING INTERNET FROM 3GPP UES USING IP-BTS, FEMTO CELL, OR LTE ACCESS NETWORK

(75) Inventors: Heeseon Lim, Cupertino, CA (US); Nishi Kant, San Jose, CA (US); Ankit Bansal, Bangalore (IN)

(73) Assignee: Stoke, Inc., Santa Clara, CA (US)

( * ) Notice: Subject to any disclaimer, the term of this patent is extended or adjusted under 35 U.S.C. 154(b) by 502 days.

(21) Appl. No.: 12/620,969

(22) Filed: Nov. 18, 2009

(65) Prior Publication Data

US 2010/0077102 A1 Mar. 25, 2010

Related U.S. Application Data

(63) Continuation-in-part of application No. 12/415,853, filed on Mar. 31, 2009.

(60) Provisional application No. 61/137,915, filed on Aug. 4, 2008, provisional application No. 61/115,868, filed on Nov. 18, 2008.

(51) Int. Cl.
| | |
|---|---|
| H04W 12/56 | (2006.01) |
| H04W 36/00 | (2009.01) |
| H04W 24/00 | (2009.01) |
| H04Q 7/20 | (2006.01) |
| H04M 7/00 | (2006.01) |
| H04M 12/66 | (2006.01) |
| G06F 15/16 | (2006.01) |
| G06F 11/00 | (2006.01) |

(52) U.S. Cl. ........ 370/401; 370/252; 370/352; 370/353; 370/356; 379/220.01; 709/238; 709/232; 455/445

(58) Field of Classification Search .......... 370/352–356, 370/310, 401, 252, 229; 709/238–244, 222, 709/223–228, 232; 379/220.01, 219, 221.01, 379/221.14, 272, 273, 266.02; 455/428, 455/445, 435.2, 432.2
See application file for complete search history.

(56) References Cited

U.S. PATENT DOCUMENTS 7,272,397 B2 * 9/2007 Gallagher et al. ............ 455/436
(Continued)

FOREIGN PATENT DOCUMENTS

| EP | 1667400 A | 6/2006 |
| EP | 1883195 A | 1/2008 |

OTHER PUBLICATIONS

International Search Report and Written Opinion mailed Dec. 17, 2009, for International Application No. PCT/US2009/052751, 14 pages.

(Continued)

*Primary Examiner* — Chandrahas Patel
*Assistant Examiner* — Wutchung Chu
(74) *Attorney, Agent, or Firm* — Blakely, Sokoloff, Taylor & Zafman LLP

(57) ABSTRACT

A type of network traffic associated with a packet received from a remote node of an access network is determined. A first interface logic routes the packet to a radio network controller (RNC) if the packet is received from an Internet protocol-basestation (IP-BTS) access network and destined to a packet core network. The RNC forwards the packet to a component of the packet core network. A second interface logic routes the packet to the component of the packet core network, including aggregating other packets of the same type received from other remote nodes, if the packet is received from a femto cell and destined to the packet core network. A breakout logic routes the packet to a destination of the Internet directly to enable the packet to reach the Internet without having to route the packet to the component of the packet core network, if the packet is destined to the Internet.

21 Claims, 5 Drawing Sheets

U.S. PATENT DOCUMENTS

| | | | |
|---|---|---|---|
| 7,505,431 B2 * | 3/2009 | Chitrapu et al. | 370/331 |
| 7,843,900 B2 * | 11/2010 | Gallagher et al. | 370/352 |
| 7,953,423 B2 * | 5/2011 | Gallagher et al. | 455/458 |
| 8,103,274 B2 * | 1/2012 | Osborn | 455/435.1 |
| 2003/0185178 A1 | 10/2003 | Chitrapu et al. | |
| 2006/0050667 A1 * | 3/2006 | Verma et al. | 370/338 |
| 2006/0104363 A1 * | 5/2006 | Chang et al. | 375/240.24 |
| 2006/0193289 A1 * | 8/2006 | Ronneke et al. | 370/329 |
| 2006/0258356 A1 | 11/2006 | Maxwell et al. | |
| 2007/0091862 A1 * | 4/2007 | Ioannidis | 370/338 |
| 2007/0243872 A1 | 10/2007 | Gallagher et al. | |
| 2008/0076412 A1 * | 3/2008 | Khetawat et al. | 455/432.1 |
| 2008/0198861 A1 * | 8/2008 | Makela | 370/401 |
| 2008/0207170 A1 * | 8/2008 | Khetawat et al. | 455/411 |
| 2008/0273524 A1 * | 11/2008 | Tenny et al. | 370/352 |
| 2009/0017864 A1 | 1/2009 | Keevill et al. | |
| 2009/0061877 A1 * | 3/2009 | Gallagher et al. | 455/436 |
| 2009/0156213 A1 * | 6/2009 | Spinelli et al. | 455/436 |
| 2009/0196233 A1 * | 8/2009 | Zhu et al. | 370/328 |
| 2009/0285225 A1 * | 11/2009 | Dahod | 370/401 |
| 2010/0041372 A1 * | 2/2010 | Linkola et al. | 455/411 |
| 2010/0246532 A1 * | 9/2010 | Olvera-Hernandez et al. | 370/331 |
| 2011/0058480 A1 * | 3/2011 | Dahlen | 370/237 |

OTHER PUBLICATIONS

International Preliminary Report on Patentability mailed Feb. 17, 2011, for International Application No. PCT/US2009/052751, 8 pages.

* cited by examiner

METHOD AND SYSTEM FOR BYPASSING 3GPP PACKET SWITCHED CORE NETWORK WHEN ACCESSING INTERNET FROM 3GPP UES USING IP-BTS, FEMTO CELL, OR LTE ACCESS NETWORK

RELATED APPLICATIONS

This application is a continuation-in-part (CIP) of co-pending U.S. patent application Ser. No. 12/415,853, filed Mar. 31, 2009, which claims the priority of U.S. Provisional Patent Application Ser. No. 61/137,915, filed Aug. 4, 2008. This application also claims the priority of U.S. Provisional Patent Application Ser. No. 61/115,868, filed, Nov. 18, 2008. The disclosures of the above-identified applications are incorporated by reference herein.

FIELD OF THE INVENTION

The present invention relates generally to general packet radio service (GPRS) networks. More particularly, this invention relates to a method for bypassing a third generation partnership project (3GPP) core network when accessing Internet from user equipment using Internet protocol (IP)-basestation (IP-BTS) and femto cell.

BACKGROUND

The GPRS or universal mobile telecommunications system (UMTS) is an evolution of the global system for mobile communications (GSM) standard to provide packet switched data services to GSM mobile stations. Packet-switched data services are used for transmitting chunks of data or for data transfers of an intermittent or bursty nature. Typical applications for 3GPP packet service include Internet browsing, wireless e-mail, and credit card processing, etc.

As the adoption of mobile broadband increases, the need for a higher capacity backhaul goes up. Evolved high speed packet access (HSPA+) already provides a bandwidth in tens of Mbps per user and adding femto services to the third-generation (3G) offerings will provide users access to more and more broadband data services, which in turn may choke the core network nodes which were not designed for the onslaught of the mobile broadband, since each user can get up to 2 Mbps creating around tenfold increase in traffic.

FIG. 1 is a block diagram illustrating a typical GPRS network architecture. Referring to FIG. 1, user equipments (UEs) 101-103 are communicatively coupled to a GPRS core network 110 via a respective access network or cell. For example, UE 101 is coupled to the core network 110 via an IP-BTS access network 104 (e.g., node B or NB) and radio network controller (RNC) 111. UE 102 is coupled to the core network 110 via a corresponding femto cell 105 (e.g., home node B or HNB). UE 103 is coupled to the core network 110 via a corresponding long term evolution (LTE) access network (e.g., evolved UMTS terrestrial RAN (E-UTRAN) node B or eNB). In order to access other networks such as Internet 120 and/or operator services node 109, UEs 101-103 have to go through core network 110. Typically, core network 110 includes a serving GPRS support node (SGSN) or serving gateway (SGW) 107 and a gateway GPRS support node (GGSN) or packet data network (PDN) GW 108. These SGSN/SGW and GGSN/PDN GW relay communications between a user terminal (e.g., source mobile station) and a destination.

Note that typically, there may be multiple SGSNs/SGWs associated with a GGSN/PDN GW, multiple access networks associated with a SGSN/SGW, and multiple UEs associated with an access network in a hierarchical structure (not shown). Thus, when traffic from the UEs increases, the traffic imposed on higher level nodes (e.g., SGSN/SGW and/or GGSN/PDN GW) in the hierarchical structure will be exponentially increased.

Based on an analysis of mobile broadband data traffic patterns, a majority of traffic from UEs is Internet bound traffic, which does not benefit from session anchoring in a traditional mobile packet core. Making the Internet bound traffic traverse the core network 110 uses core network 110 resources and will add unnecessary delays to the Internet traffic. With the increase in mobile broadband traffic, the built-in hierarchy in the existing architecture results in more investment in the core network 110, and the transmission network from an access network to a core network without exploiting the nomadic and Internet nature of traffic.

There are many methods and systems to address the issue of offloading the load from operator networks as broadband services are getting more and more popular. However, most of these ideas only address part of the network or subset of available technologies. For example, femto cell architecture helps offloading the backhaul between a radio access network (RAN) and a core network (CN), but it may end up adding more loads on to CN. The IP-BTS technology also offloads the backhaul but security issue over open IP arises (while CN is not offloaded either).

SUMMARY OF THE DESCRIPTION

A type of network traffic associated with a packet received from a remote node of an access network is determined. A first interface logic routes the packet to a radio network controller (RNC) associated with a radio access network (RAN) if the packet is received from an Internet protocol-basestation (IP-BTS) access network and destined to a packet core network. The RNC forwards the packet to a component of the packet core network. A second interface logic routes the packet to the component of the packet core network, including aggregating other packets of the same type received from other remote nodes, if the packet is received from a femto cell and destined to the packet core network. Breakout logic routes the packet to a destination of the Internet directly to enable the packet to reach the Internet without having to route the packet to the component of the packet core network, if the packet is destined to the Internet.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiment, a mechanism is provided to channelize network traffic directly from various access networks, including RANs, femto cells, and LTEs, to the Internet, by passing the GPRS core network and thus saving critical resources (e.g., backhaul and core network nodes). In one embodiment, a multi-function gateway (also referred to as a mobile data offload gateway or MDO-GW) is configured to support various access technologies, maintain sessions from each of these access technologies, and route the network traffic directly to the Internet, as well as, to the operator services of the core network, based on the types of network traffic. The network traffic may be routed without going through components of the core network (e.g., SGSN/SGW or GGSN/PDN GW).

Figure 1:
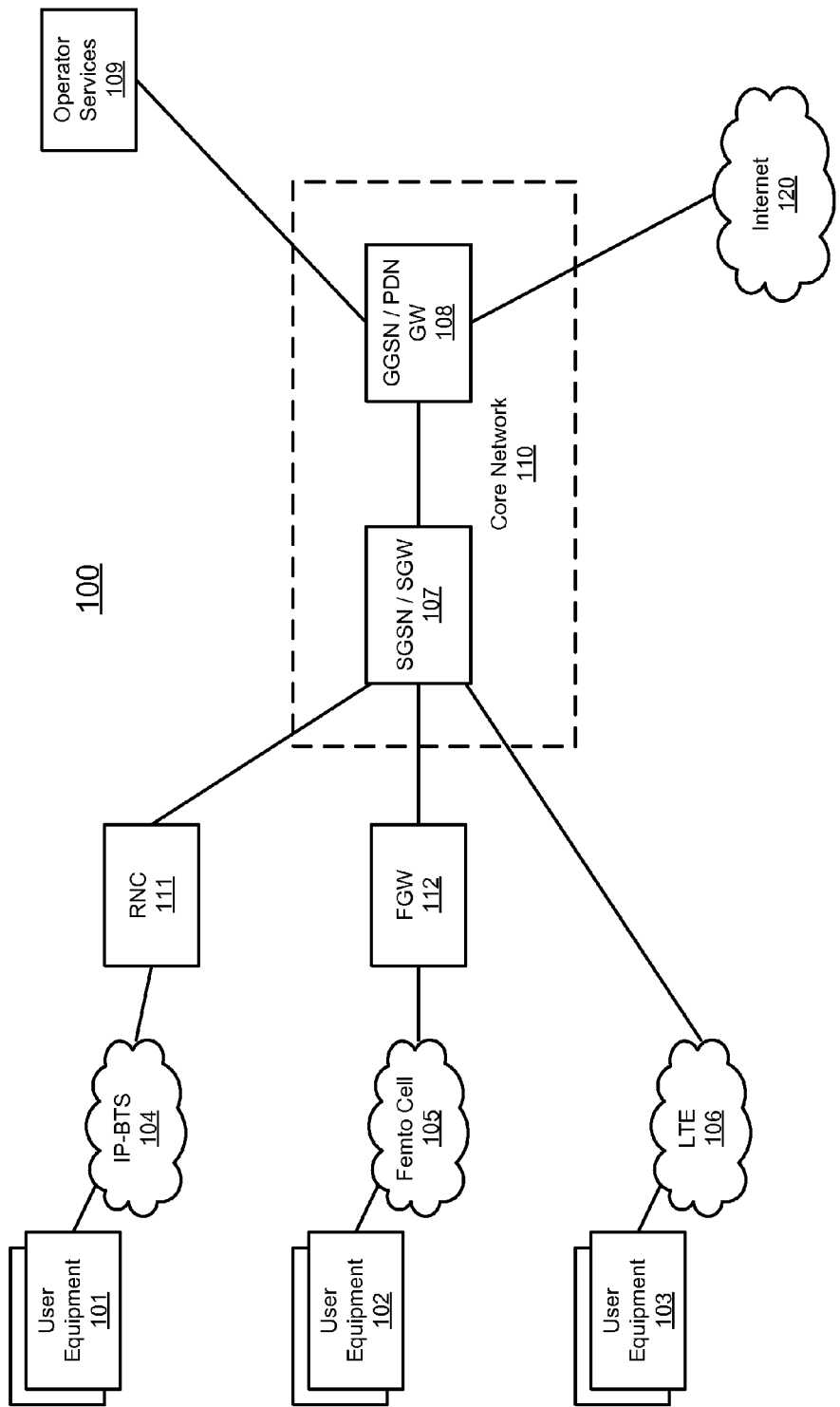
FIG. 1 is a block diagram illustrating typical 3GPP packet architecture.
Figure 2:
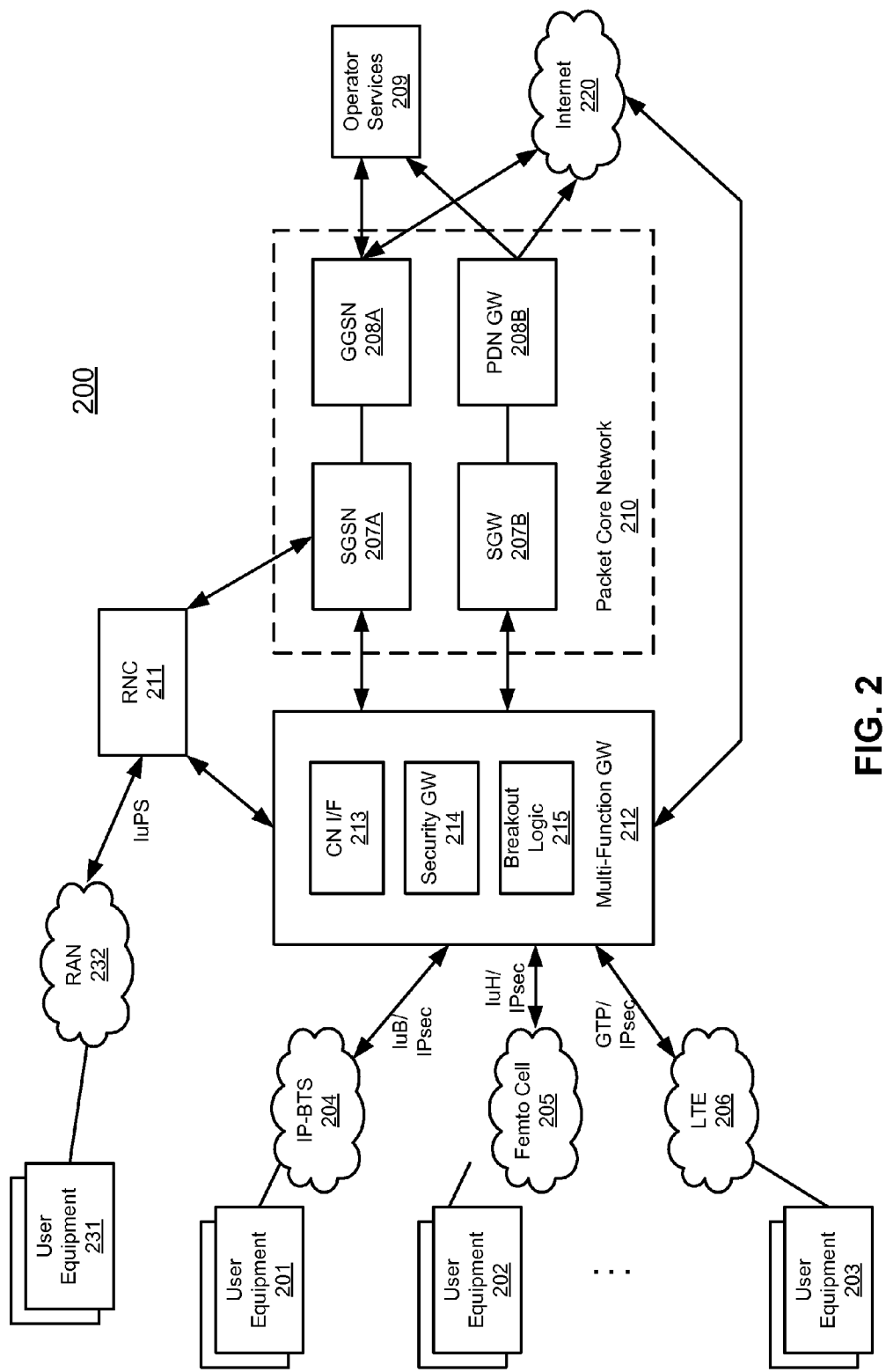
FIG. 2 is a block diagram illustrating a 3GPP packet system according to one embodiment.

FIG. 2 is a block diagram illustrating a network configuration according to one embodiment of the invention. Referring to FIG. 2, user equipments (UEs) 201-203 and 231 are communicatively coupled to a GPRS core network 210 via a multi-function GW 212 having breakout functionality for accessing the Internet without going through the core network 210. For example, UE 201 is coupled to the multi-function GW 212 via an IP-BTS access network 204 (e.g., node B or NB). UE 202 is coupled to the multi-function GW 212 via a corresponding femto cell 205 (e.g., home node B or HNB). UE 203 is coupled to the multi-function GW 212 via a corresponding long term evolution (LTE) access network 206 (e.g., evolved UMTS terrestrial RAN (E-UTRAN) node B or eNB). UE 231 is coupled to RNC 211 via a conventional radio access network (RAN) 232.

A femto cell is a small cellular basestation, typically designed for use in a home or small business. It connects the service provider's network via broadband such as digital subscriber line (DSL) or cable. A femto cell allows service providers to extend service coverage indoors, especially where access would otherwise be limited or unavailable. The femto cell incorporates the functionality of a typical basestation but extends it to allow a simpler, self contained deployment.

Core network 210 may be a third-generation (3G) packet core network, a fourth-generation (4G) packet core network, or a combination of both. Typically, a 3G packet core network includes a serving GPRS support node (SGSN) 207A and a gateway GPRS support node (GGSN) 208A. A 4G packet core network includes a serving gateway (SGW) 207B and a packet data network (PDN) GW 208B. These SGSN/SGW 207A-207B and GGSN/PDN GW 208A-208B relay communications between a user terminal (e.g., source mobile station) and a destination. Note that typically, there may be multiple SGSNs/SGWs associated with a GGSN/PDN-GW, multiple access networks associated with a SGSN/SGW, and multiple UEs associated with an access network in a hierarchical structure (not shown).

In one embodiment, the multi-function GW 212 includes, among others, core network interface logic 213, a Security GW 214, and breakout logic 215. Security GW 214 is designed to protect traffic between the multi-function GW 212 and various access networks 204-206. Breakout logic 215 is designed to determine whether the network traffic from the various access networks 204-206 is destined to Internet 220 or core network 210. Breakout logic 215 may include a traffic identification unit (not shown) to distinguish the traffic destined towards operator's services 209 from that is exchanged with the Internet 220. If it is determined that the network traffic is destined to the Internet, the breakout logic 215 is configured to divert the traffic to the nearest Internet access point to reach Internet 220 directly without going through core network 210. If it is determined that the network traffic is destined for the core network 210, the traffic is routed to core network 210 via corresponding core network interface 213, dependent upon the type of traffic. Note that some or all of the components as shown in FIG. 2 may be implemented in hardware, firmware, software, or a combination there of.

Figure 3:
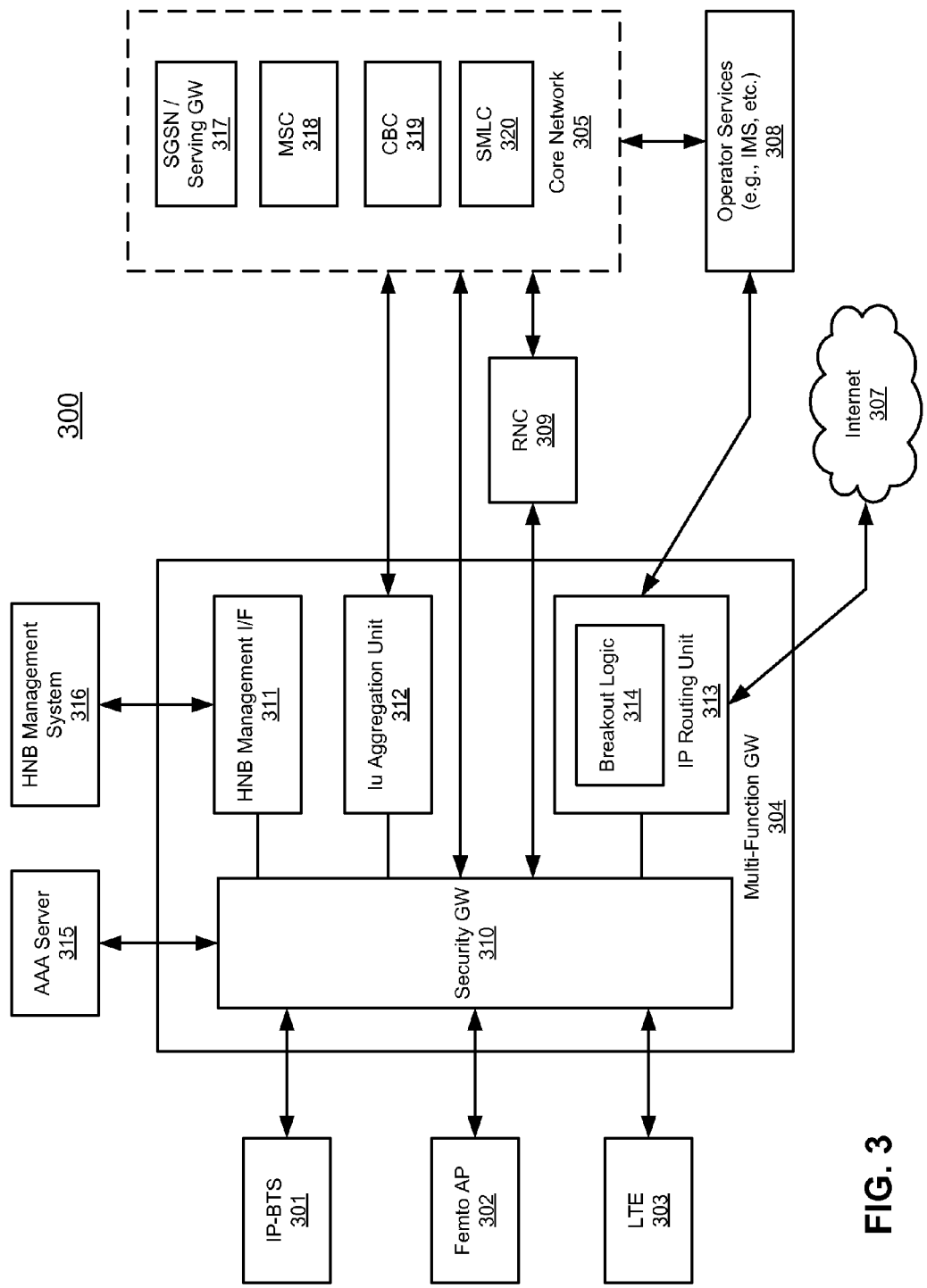
FIG. 3 is a block diagram illustrating a 3GPP packet system according to another embodiment.

FIG. 3 is a block diagram illustrating a network configuration according to another embodiment of the invention. Similar to configuration 200 of FIG. 2, configuration 300 includes various access networks 301-303 coupled to a multi-function GW 304, where the multi-function GW 304 is located between the access networks 301-304 and the core network 305. In one embodiment, the multi-function GW 304 includes a Security GW 310, a HNB management interface 311, a femto traffic aggregation unit 312, and a IP routing unit 313 having breakout logic 314.

Security GW 310 is designed to protect traffic exchanged between the multi-function GW 304 and the access networks 301-303. Security GW 310 is configured to authenticate UEs coming from the access networks 301-303, for example, using certain information retrieved from the authentication, authorization, and accounting (AAA) server 315. In addition, Security GW 310 is configured to terminate a secured connection such as an Internet protocol (IP) security (IPsec) connection from an access network. Based on traffic terminated by Security GW 310, IP routing unit 313 is used to route traffic that is destined to particular operator services 308 without going through core network by using its traffic re-direct policy. In addition, the breakout logic 314 is configured to determine whether traffic is destined to the Internet 307. If it is determine that the traffic is destined to Internet 307, the breakout logic 314 is configured to divert the traffic to the nearest Internet access point of the Internet 307 via IP routing unit 313.

Otherwise, if the traffic is determined to access core network 305, the traffic is routed to core network 305. For example, if traffic is originate from IP-BTS 301 and destined to core network 305, the traffic is routed to core network 305 via RNC (radio network controller) 309. If the traffic is originated from femto access point 302, the traffic is processed by femto traffic aggregation unit 312 and the routed to core network 305. That is, multi-function GW 304 may include several interface logics coupled to or implemented as part of Security GW 310. If traffic is originated from LTE E-UTRAN (eNodeB) 303, the traffic is forwarded to SGW 317. Each interface logic is configured to handle a specific type of signaling protocol (e.g., IuB, IuH, IuPS, or GTP).

According to one embodiment, when a UE attempts to establish a connection to core network 305 via the multi-function GW 304, certain network configuration information or parameters of control signals or packets are captured by the multi-function GW 304. The captured information is used to determine whether the connection to be established is for accessing the Internet 307. A packet inspector (not shown) may inspect the packets to determine whether the connection is requesting for accessing the Internet 307. For example, if the access point name in the control packets is associated with an Internet access point, the connection is most likely destined for the Internet. In return, instead of using an IP address of core network 305, an IP address associated with the multi-function GW 304 may be used, which designates the multi-function GW 304 as an end point of connection session or tunnel between a UE and the multi-function GW 304. Therefore, subsequent data packets of the connection are routed to the multi-function GW 304 (instead of core network 305), which can divert the traffic to Internet 307 as part of normal forwarding processes on the data planes or line cards of the multi-function GW 304. Further detailed information concerning the diverting Internet traffic can be found in the above-incorporated by reference applications.

The multi-function GW 304 further includes a home node B (HNB) management interface 311 configured to access a HNB management system 316 for managing a HNB of a femto cell. Core network 305 typically includes standard components of a GPRS core network, such as SGSN/SGW 317, mobile switch center (MSC) 318, cell broadcast center (CBC) 319, and serving mobile location center (SMLC) 320, etc.

Note that although IP-BTS 301, femto AP 302, and LTE 303 are described as examples of access technologies, other access technologies may also be applied herein. Also note that some or all of the components as shown in FIG. 3 may be implemented in hardware, firmware, software, or a combination there of.

Figure 4:
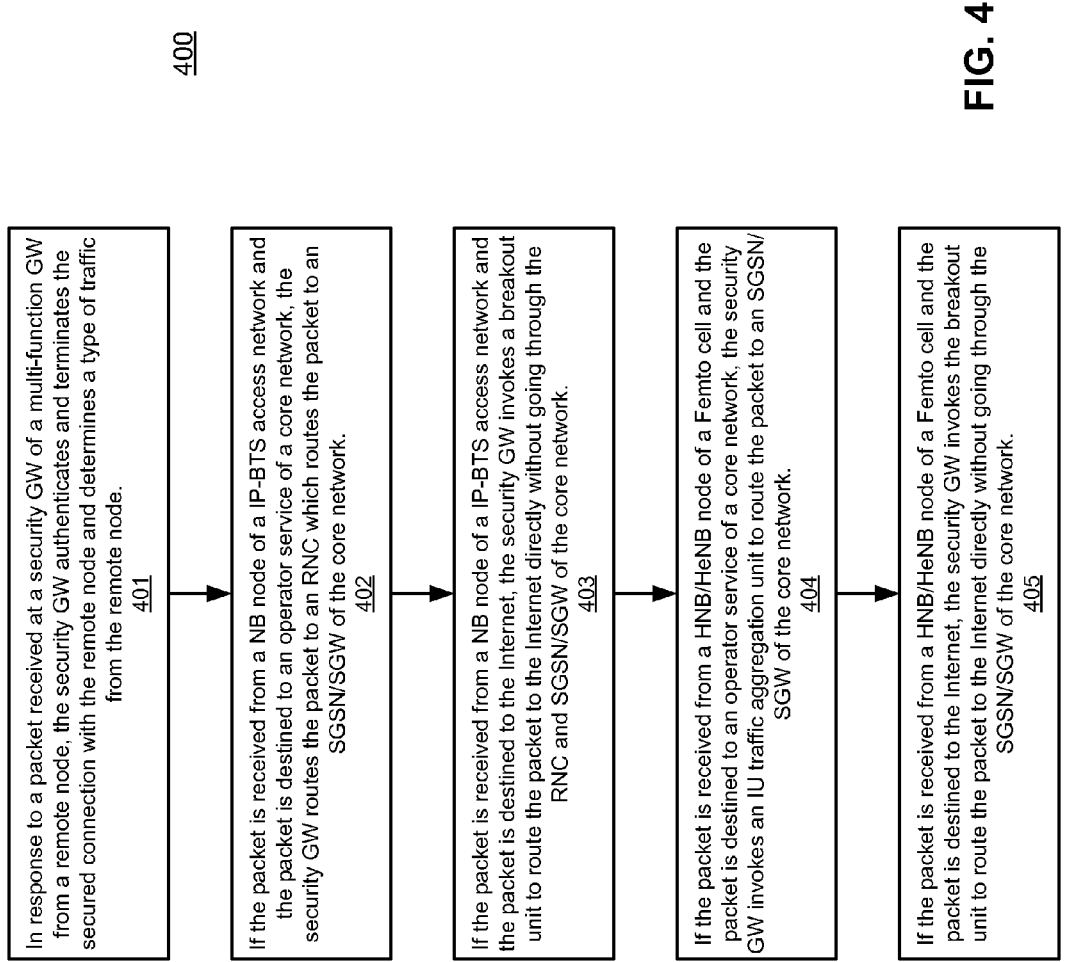
FIG. 4 is a flow diagram illustrating a process for routing 3GPP data packets according to one embodiment of the invention.

FIG. 4 is flow diagram illustrating a method for processing network traffic in a GPRS network according to one embodiment of the invention. Note that method 400 may be performed by processing logic which may include software, firmware, hardware, or a combination thereof. For example, method 400 may be performed by multi-function GW 212 of FIG. 2 or multi-function GW 314 of FIG. 3. Referring to FIG. 4, in response to a packet received at a security gateway of a multi-function gateway device from a remote node, at block 401, the security gateway authenticates and terminates the secured connection with the remote node if needed, and determines a type of traffic of the connection with the remote node.

At block 402, if the packet is received from a node B (NB) of an IP-BTS access network (e.g., via IuB signaling protocol), a corresponding interface logic (e.g., IuB interface logic) is invoked to determine whether the packet is destined to an operator service via packet core network 305. If it is determined that the packet is destined to the core network, the interface logic is configured to route the packet to an RNC associated with the IP-BTS access network (e.g., RAN), where the RNC routes the packet to a component (e.g., an SGSN) of the core network.

In addition, if it is determined that the packet is destined to a specific operating service node, the corresponding interface logic invokes a IP routing unit to directly route the packet to the operator service node without going through certain components (e.g., SGSN/SGW) of the core network. If it is determined that the packet is destined to the Internet, at block 403, the interface logic invokes a breakout logic to route the packet to a nearest Internet access point to reach the Internet, without going through certain components (e.g., SGSN/SGW or GGSN/PDN GW) of the core network.

Similarly, if it is determined that the packet is received from a home node B (HNB) of a femto cell (e.g., via IuH signaling protocol) and the packet is destined to the core network, at block 404, the interface logic is configured to invoke a traffic aggregation unit (e.g., femto aggregation or IuH aggregation unit) to route the packet to a component (e.g., an SGSN/SGW) of the core network.

In addition, if it is determined that the packet is destined to a specific operating service node, the corresponding interface logic invokes the IP routing unit to directly route the packet to the operator service node without going through certain components (e.g., SGSN/SGW) of the core network. If it is determined that the packet is destined to the Internet, at block 405, the interface logic invokes the breakout logic to route the packet to a nearest Internet access point to reach the Internet, without going through certain components (e.g., SGSN/SGW or GGSN/PDN GW) of the core network. Note that method 400 may also be applied to other types of traffic, such as traffic from an LTE access network (e.g., via GTP signaling protocol and handled by a corresponding GTP interface logic) or from a conventional RAN access network (e.g., via IuPS signaling protocol by a corresponding IuPS interface logic).

Figure 5:
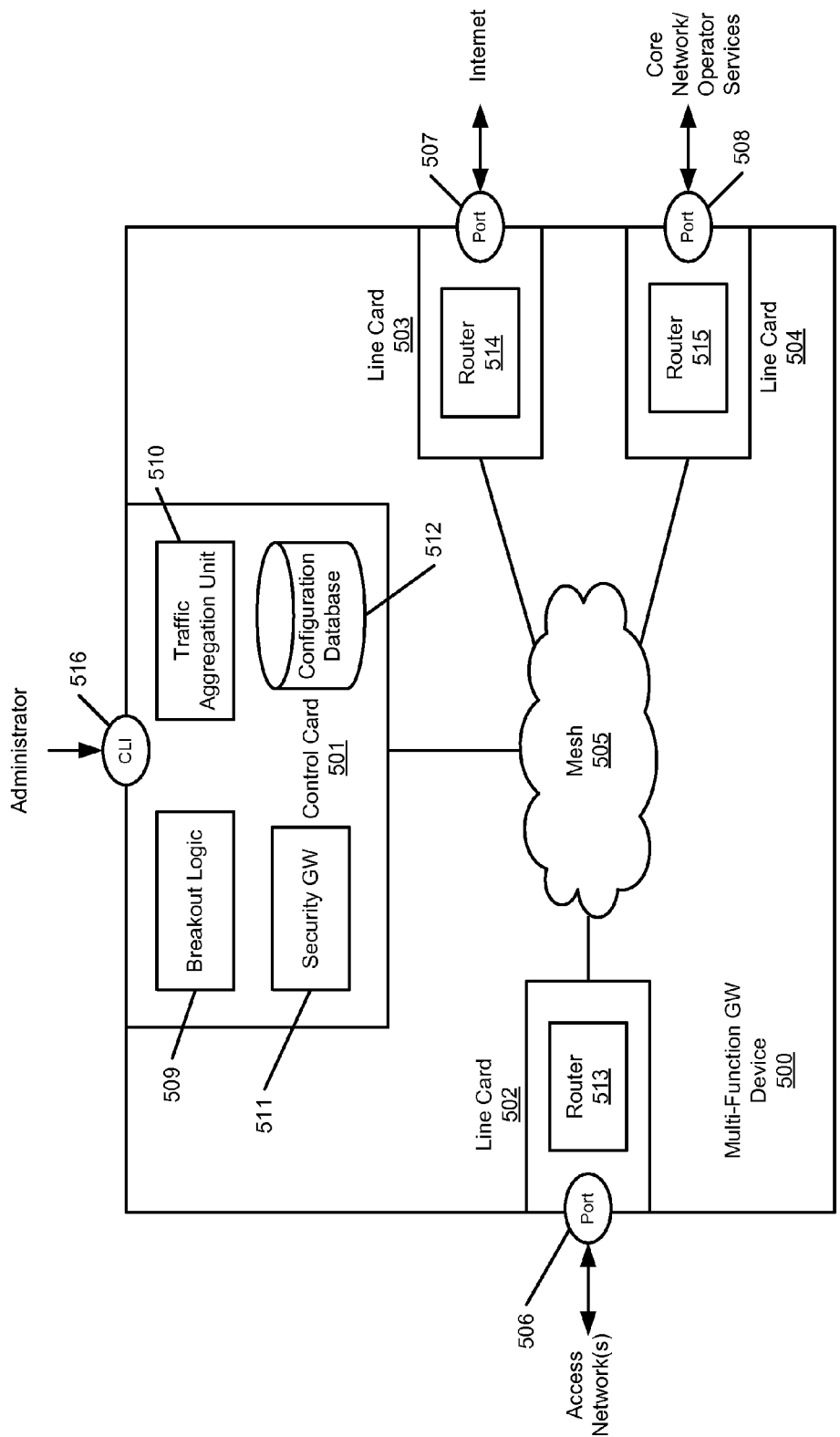
FIG. 5 is a block diagram illustrating a multi-function GW device according to one embodiment of the invention.

FIG. 5 is a block diagram illustrating a multi-function GW device according to one embodiment of the invention. For example, multi-function GW 500 may be implemented as part of multi-function GW 212 of FIG. 2 or multi-function GW 304 of FIG. 3. Referring to FIG. 5, multi-function GW 500 includes, but is not limited to, a control card 501 (also referred to as a control plane) communicatively coupled to one or more line cards 502-504 (also referred to as interface cards or user planes) over a mesh 505, which may be a mesh network, an interconnect, a bus, or a combination thereof. Each of the line cards 503-504 is associated with one or more interfaces (also referred to as ports), such as interfaces 506-508 respectively. Each line card includes routing functional block (e.g., blocks 513-515) to route packets via the corresponding interface according to a configuration (e.g., routing table) configured by control card 501. For the purpose of illustration, it is assumed that interface 506 is to be coupled to an access network (e.g., IP-BTS, femto cell, and/or LTE); interface 507 is to be coupled to the Internet; and interface 508 is to be coupled to core network and/or operator services.

According to one embodiment, control card 501 includes a breakout unit 509, a traffic aggregation unit 510, a Security GW 511, and a configuration database 512. In one embodiment, as discussed above, Security GW 511 is configured to handle a secured connection with a remote client and terminates the security connection (e.g., IPsec connection). The Security GW 511 may include or be associated with multiple interface logics, each handling a specific type of signaling protocols (e.g., IuB, IuH, IuPS, or GTP signaling protocols) to determine whether a particular packet or flow of packets is destined to the Internet, core network, or a particular operator service, and to route the packet or packets accordingly, using some of the techniques described above. For example, if the traffic is destined to the Internet, breakout logic 509 is invoked to set up appropriate routing information (e.g., routing table) to allow the line cards 502-503 (also referred to as forwarding planes) to route the packet or packets to the Internet. If the traffic is received from a femto cell and destined to the core network/operator services, the traffic aggregation unit 510 is invoked to set up an aggregation function to allow the line cards 502 and 504 to route the packet or packets to the core network/operator services. Note that some or all components as shown herein may be implemented in hardware, firmware, software, or a combination thereof.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method performed within a network element for processing network traffic of a packet network, the method comprising:
   determining, by a security gateway (GW) unit of a multi-function gateway (MGW), a type of network traffic associated with a packet received from a remote node of an access network, wherein the MGW operates as a GW between a plurality of access networks and a packet core network;
   routing, by a first interface logic of the MGW, the packet to a radio network controller (RNC) associated with a radio access network (RAN) if the packet is received from an Internet protocol-basestation (IP-BTS) access network and destined to the packet core network, wherein RNC forwards the packet to a component of the packet core network;
   routing, by a second interface logic of the MGW, the packet to the component of the packet core network, including aggregating other packets of the same type received from other remote nodes, if the packet is received from a femto cell and destined to the packet core network; and
   routing, by a breakout logic of the MGW, the packet to a destination of the Internet directly to enable the packet to reach the Internet without having to route the packet to the component of the packet core network, if the packet is destined to the Internet regardless of the remote node of an access network the packet is received from.

2. The method of claim 1, wherein the component of the packet core network is one of a general packet radio service (GPRS) support node (SGSN) and serving gateway (SGW) of the packet core network.

3. The method of claim 1, wherein determining a type of network traffic further comprises authenticating and terminating, by a security gateway unit, a secured connection with the remote node if the packet is received via the secured connection.

4. The method of claim 3, wherein the secured connection is an Internet protocol security (IPsec) compatible connection, and wherein the security gateway unit is configured to communicate with an authentication, authorization, and accounting (AAA) server via a management communication interface to perform one of authentication and authorization of the remote node.

5. The method of claim 1, further comprising routing, by a third interface logic, the packet to the component of the packet core network, if the packet is received from a long term evolution (LTE) access network and destined to the packet core network.

6. The method of claim 5, wherein the first interface logic is configured to handle an IuB signaling protocol, wherein the second interface logic is configured to handle an IuH signaling protocol, and wherein the third interface logic is configured to handle an S1 interface based on GPRS tunneling protocol (GTP).

7. The method of claim 5, further comprising routing, by a IP routing unit, the packet directly to an operator service node without going through the component of the core packet network, if the packet is destined to an operator service associated with the operator service node.

8. The method of claim 1, further comprising:
   in response a request for establishing a communication session from the remote node of the access network, determining whether one ore more parameters specified by the request is associated with an Internet service for the Internet; and establishing a tunnel between the remote node and the network element, such that data exchanged through the tunnel is directly routed to the network element without being routed to the component of the packet core network.

9. A network element for processing network traffic of a packet network, the network element comprising:

a security gateway unit to secure the traffic received from a remote node of an access network, wherein the network element operates as a GW between a plurality of access networks and a packet core network;

a traffic identification unit to determine a type of network traffic associated with a packet received from a remote node of an access network;

a first interface logic coupled to the security gateway to route the packet to a radio network controller (RNC) associated with a radio access network (RAN) if the packet is received from an Internet protocol-basestation (IP-BTS) access network and destined to the packet core network, wherein RNC forwards the packet to a component of the packet core network;

a second interface logic coupled to the security gateway to route the packet to the component of the packet core network, including aggregating other packets of the same type received from other remote nodes, if the packet is received from a femto cell and destined to the packet core network; and a breakout unit coupled to the security gateway to route the packet to a destination of the Internet directly to enable the packet to reach the Internet without having to route the packet to the component of the packet core network, if the packet is destined to the Internet.

10. The network element of claim 9, wherein the component of the packet core network is one of a general packet radio service (GPRS) support node (SGSN) and serving gateway (SGW) of the packet core network.

11. The network element of claim 9, further comprises a security gateway unit coupled to the first and second interface logics to authenticate and terminate a secured connection with the remote node if the packet is received via the secured connection.

12. The network element of claim 11, wherein the secured connection is an Internet protocol security (IPsec) compatible connection, and wherein the security gateway unit is configured to communicate with an authentication, authorization, and accounting (AAA) server via a management communication interface to perform one of authentication and authorization of the remote node.

13. The network element of claim 9, further comprising a third interface logic coupled to the security gateway unit to route the packet to the component of the packet core network, if the packet is received from a long term evolution (LTE) access network and destined to the packet core network.

14. The network element of claim 13, wherein the first interface logic is configured to handle an IuB signaling protocol, wherein the second interface logic is configured to handle an Ih-H signaling protocol, and wherein the third interface logic is configured to handle an S1 interface based on GPRS tunneling protocol (GTP).

15. The network element of claim 13, further comprising a IP routing unit coupled to the security gateway unit to route the packet directly to an operator service node without going through the component of the core packet network, if the packet is destined to an operator service associated with the operator service node.

16. The network element of claim 9, wherein the breakout unit is further configured to in response a request for establishing a communication session from the remote node of the access network, determine whether one or more parameters specified by the request is associated with an Internet service for the Internet, and establish a tunnel between the remote node and the network element, such that data exchanged through the tunnel is directly routed to the network element without being routed to the component of the packet core network.

17. A non-transitory machine-readable storage medium having instructions stored therein, which when executed by a machine, cause the machine to perform a method within a network element for processing network traffic of a packet network, the method comprising:

determining, by a security gateway (GW) unit of a multi-function GW (MGW), a type of network traffic associated with a packet received from a remote node of an access network, wherein the MGW operates as a GW between a plurality of access networks and a packet core network;

routing, by a first interface logic of the MGW, the packet to a radio network controller (RNC) associated with a radio access network (RAN) if the packet is received from an Internet protocol-basestation (IP-BTS) access network and destined to the packet core network, wherein RNC forwards the packet to a component of the packet core network;

routing, by a second interface logic of the MGW, the packet to the component of the packet core network, including aggregating other packets of the same type received from other remote nodes, if the packet is received from a femto cell and destined to the packet core network; and routing, by a breakout logic of the MGW, the packet to a destination of the Internet directly to enable the packet to reach the Internet without having to route the packet to the component of the packet core network, if the packet is destined to the Internet.

18. The non-transitory machine-readable storage medium of claim 17, wherein determining a type of network traffic further comprises authenticating and terminating, by a security gateway unit, a secured connection with the remote node if the packet is received via the secured connection.

19. The non-transitory machine-readable storage medium of claim 17, wherein the method further comprises routing, by a third interface logic, the packet to the component of the packet core network, if the packet is received from a long term evolution (LTE) access network and destined to the packet core network.

20. a The non-transitory machine-readable storage medium of claim 19, wherein the first interface logic is configured to handle an IuB signaling protocol, wherein the second interface logic is configured to handle an IuH signaling protocol, and wherein the third interface logic is configured to handle an S1 interface based on GPRS tunneling protocol (GTP).

21. The non-transitory machine-readable storage medium of claim 19, wherein the method further comprises routing, by a IP routing unit, the packet directly to an operator service node without going through the component of the core packet network, if the packet is destined to an operator service associated with the operator service node.

* * * * *